April 29, 1969  D. B. LOUGHLIN  3,441,070
FOOD GRATING DEVICE
Filed March 16, 1967  Sheet 1 of 2
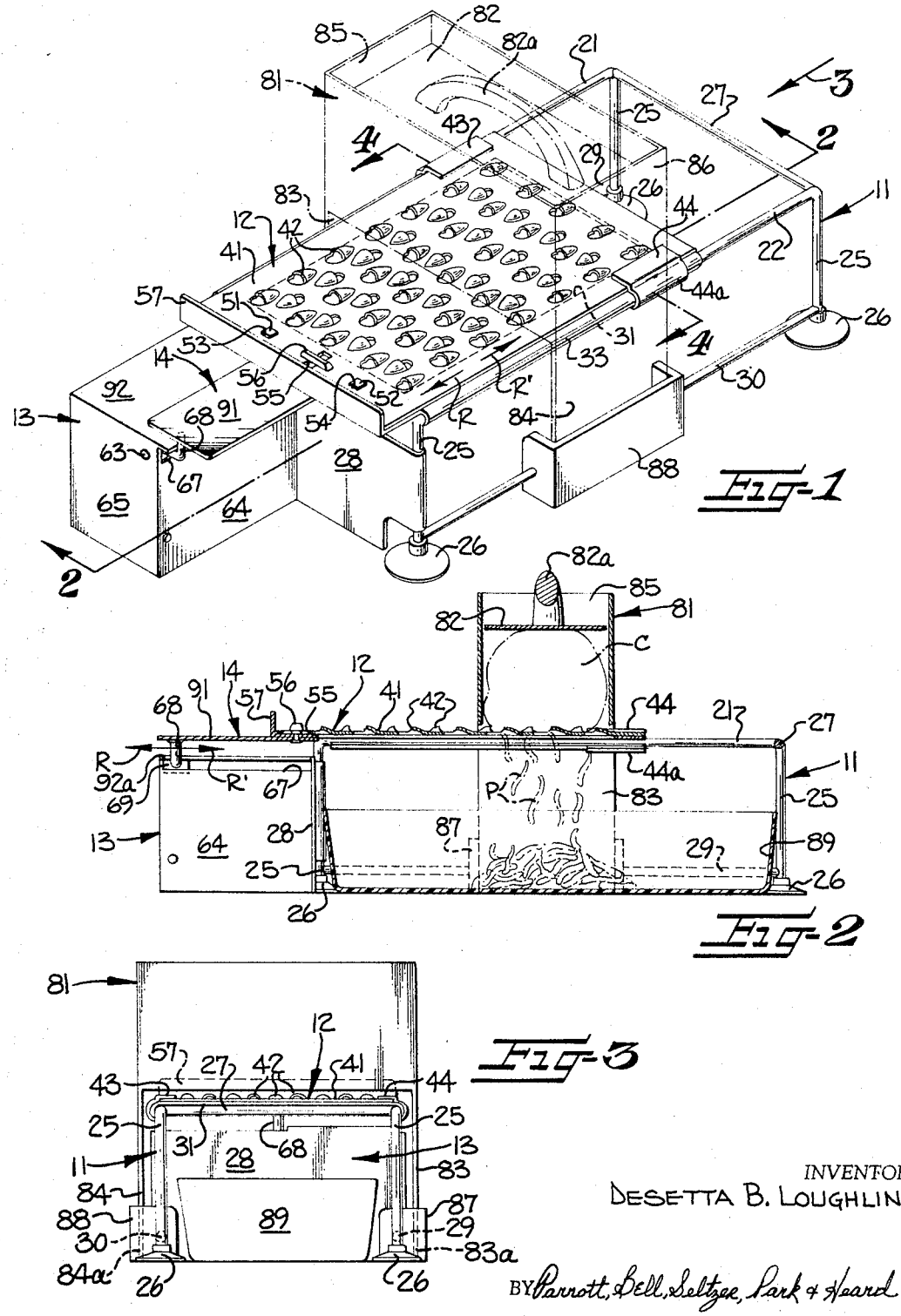
INVENTOR:
DESETTA B. LOUGHLIN
BY Parrott, Bell, Seltzer, Park & Heard
ATTORNEYS April 29, 1969    D. B. LOUGHLIN    3,441,070
FOOD GRATING DEVICE
Filed March 16, 1967                    Sheet 2 of 2
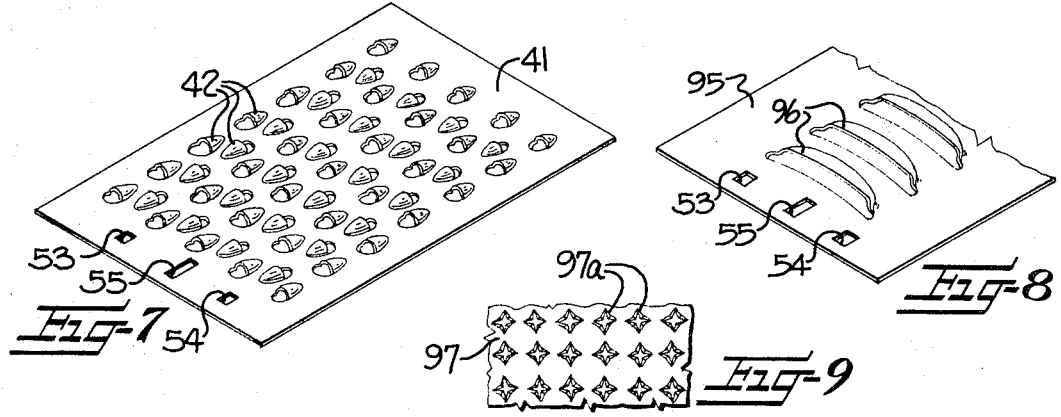
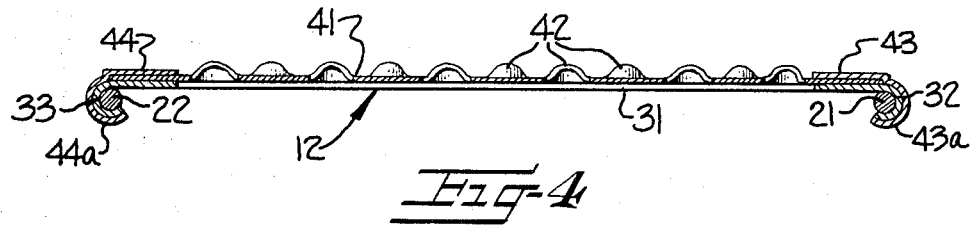
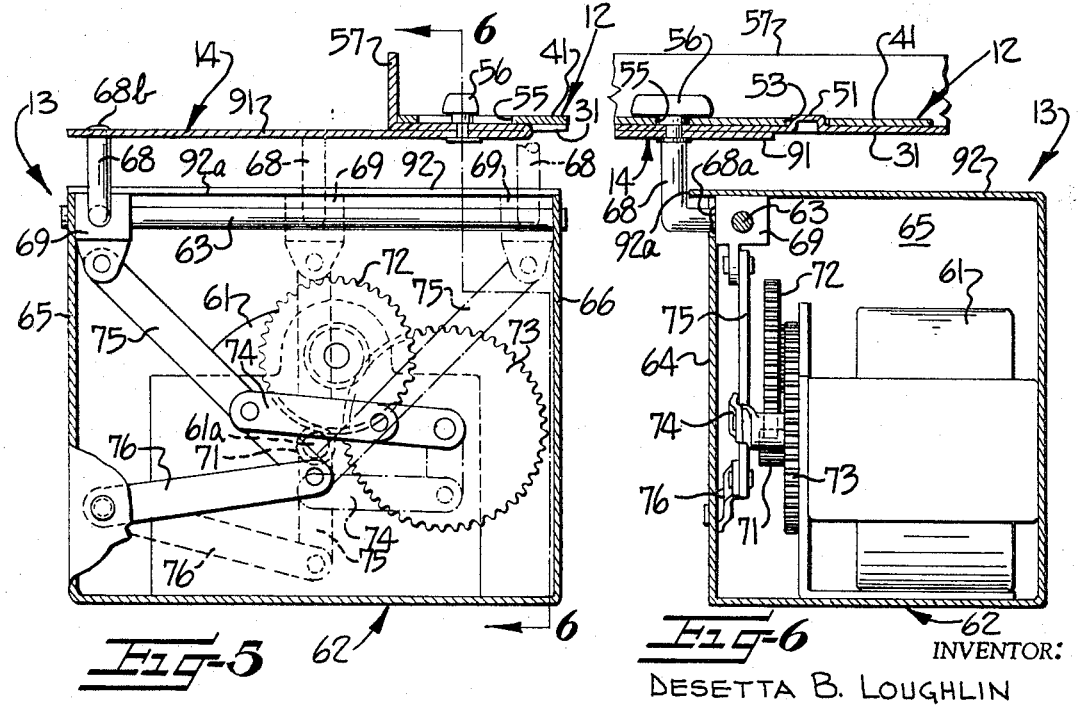
INVENTOR:
DESETTA B. LOUGHLIN
BY Parrott, Bell, Seltzer, Park & Heard
ATTORNEYS United States Patent Office
3,441,070
Patented Apr. 29, 1969

3,441,070
FOOD GRATING DEVICE
Desetta B. Loughlin, Box 833, Southport, N.C. 28461
Filed Mar. 16, 1967, Ser. No. 623,735
Int. Cl. A47j 19/00; B02c 18/00
U.S. Cl. 146—178                                    10 Claims

ABSTRACT OF THE DISCLOSURE

An automatically-operated food grating machine having a horizontally-reciprocable cutting section including a reciprocable frame member having a greater plate removably supported thereon, thereby permitting the selective use of a plurality of greater plates possessing different size and/or shape cutting elements; and wherein the power and drive components of the grating machine are constructed so as to provide maximum operator safety and discourage contamination thereof by grated food particles.

---

This invention relates to a food grating device of the type wherein the cutting elements thereof are moved past a stationary food product to provide a grating function.

It is an object of this invention to provide an improved food grating machine having a horizontally-disposed grating surface which is automatically reciprocated along a predetermined, horizontally-extending path of travel to cut food products urged thereagainst.

It is another object to provide a grating machine in which a particular desired grater plate may be readily inserted and removed, at the will of the operator, so as to provide selective cutting of food products by the use of grater plates of differing characteristics, and also so as to facilitate cleaning of the plates and other machine components.

It is a further object to provide an automatically-operated grating machine wherein the movable drive components of the machine are so constructed and arranged as to provide maximum safety during operation of the machine.

It is an aditional object to provide an automatic food grating machine wherein the power section for reciprocating the cutting elements of the machine is enclosed in such a manner as to discourage contamination thereof by food particles during operation of the machine.

Some of the objects of the invention having been stated, other objects will appear as the description proceeds, when taken in connection with the accompanying drawings, in which:

FIGURE 1 is a perspective view of a grating machine of the present invention, with a food-retaining housing thereof shown in broken lines;

FIGURE 2 is a sectional view of the grating machine taken generally along line 2—2 of FIGURE 1 and looking in the direction of the arrows;

FIGURE 3 is an end elevational view of the grating machine of FIGURE 1, looking in the direction of arrow 3;

FIGURE 4 is a sectional view of the grater plate and immediately-adjacent components of the grating machine, taken along line 4—4 of FIGURE 1;

FIGURE 5 is a side elevational view of the power section for reciprocating the grating surface of the machine, the housing therfor being partially broken away to better disclose details of construction;

FIGURE 6 is a sectional view taken generally along line 6—6 of FIGURE 5;

FIGURE 7 is a perspective view of the grater plate seen in FIGURE 1;

FIGURE 8 is a fragmentary perspective view of an alternate grater plate; and

FIGURE 9 is a fragmentary plan view showing the cutting elements of another alternate grater plate.

Referring more specifically to FIGURE 1, the grating machine of the present invention generally includes a stationary support section 11, a reciprocally-mounted cutting section 12 and a power section 13. Drive elements, generally indicated at 14, interconnect the power and cutting sections and transmit movement to reciprocate the cutting section during operation of the grating machine, as will be explained.

The support section 11 includes a pair of rod-shaped guide members 21 and 22 which are disposed in a generally horizontal plane above a suitable supporting surface, such as a table (not shown), by depending rod-shaped legs 25 which are formed integrally with and extend downwardly from the ends of the guide members 21, 22. The lower ends of the legs 25 are provided with suitable friction means, such as suction cups 26, which are adapted to engage a supporting surface and maintain the grating machine stationary. The guide members 21, 22 are disposed in horizontally spaced, parallel, co-extending relation by an interconnecting rod element 27 joning one end of the guide members and by a plate 28 joining the support legs 25 at the other end of the guide members. Respective pairs of the support legs 25 are further stabilized and strengthened by additional corresponding interconnecting rods 29 and 30 (FIGURES 1 and 3).

The cutting section 12 includes an open, generally rectangular frame member 31 which extends substantially horizontally between the guide members 21 and 22. As seen in FIGURES 1 and 4, opposite sides of the frame member 31 adjacent the guide members 21, 22 have arcuately-shaped flanged edges 32, 33 which loosely surround the respective guide members 21, 22 and are freely slidable thereon to permit reciprocation of the frame member longitudinally of the guide members in the directions indicated by arrows R, R' in FIGURE 1.

Supported on the upper surface of the frame member 31 is a relatively flexible grater plate 41 which is of rectangular shape and has peripheral dimensions generally corresponding to the outer horizontel dimensions of the frame member 31. The grater plate is provided with a plurality of raised cutting edges 42 of generally semi-circular shape which extend over a major portion of the plate and overlie the opening in the frame member 31. The plate may be constructed of various materials having sufficient strength to be utilized in the cutting of food products and which is thin enough to permit the plate to be flexed for removal, as will be explained. Materials suitable for this use may be stainless steel, steel sheet metal, plastics, or the like.

One end of the grater plate 41 is removably secured to the frame member by a pair of guide clips 43, 44. These include flat main-body portions which overlie marginal areas of the upper face of the plate, and arcuately-shaped flange portions 43a, 44a which depend downwardly therefrom and are secured, as by a snap-fit about the adjacent flanged edges 32, 33 of the frame member (FIGURE 4). The guide clips 43, 44 prevent movement of the underlying end portion of the plate in a direction transverse to the direction of reciprocation R, R' of the frame member, as well as in an upward direction away from the upper face of the frame member. However, the guide clips readily permit sliding disengagement of the grater plate from the member in either of the directions R, R' of reciprocation of the frame.

The opposite end of the grater plate 41 is secured to the frame member 31 by a pair of spaced projections 51, 52 connected to the frame member which extend upwardly therefrom and are received within a corresponding pair of apertures 53, 54 (FIGURES 1 and 7) in the grater plate 41. Positioned between the projections and extending through a central, elongate aperture 55 in the grater plate is a rotatable T-bar fastener 56 which locks the grater plate against upward displacement from the projections 51, 52. As can be seen, when the apertures 53, 54 are engaged by the corresponding projections 51, 52, in the frame member, the grater plate is restrained against movement relative to the frame member in the directions of reciprocation thereof.

To remove the grater plate 41 from the frame member 31 for cleaning and/or replacement, the fastener 56 is rotated 90 degrees from its position in FIGURE 1 and the adjacent end portion of the grater plate 41 is flexed upwardly to disengage the projections 51, 52 from the apertures 53, 54. The grater plate may then readily be slidably removed from under the guide clips 43, 44. To facilitate alignment of the projections and apertures when the grater plate is again placed on the frame member, the end of the frame member adjacent such projections is provided with an upturned lip or flange 57, which flange also serves to stabilize the grater plate during reciprocation of the cutting section.

Disposed above the grater plate 41, at substantially the midportion of length of the rod-shaped guide members 21, 22 is an open-bottomed food housing 81 (shown in broken lines in FIGURE 1). The food housing 81 has a vertically-movable closure lid 82 (FIGURE 2) which may be readily removed from the housing 81 by a handle 82a to permit the insertion of food products therein. The housing is supported above the cutting section of the grating machine by a pair of downwardly depending walls 83, 84 which are extensions of the opposing end walls 85, 86 of the housing. The lower ends 83a, 84a (FIGURE 3) of the support walls are telescopically received within corresponding slots in a pair of brackets 87, 88 (FIGURE 3), which rest upon the surface supporting the machine and are secured to the respective rods 29, 30 connecting the legs 25 on each side of the support section 11. In addition to supporting the food housing 81, the downwardly extending walls 82, 83 also confine and direct the food particles falling from the grating surface of the grater plate 41.

During a food grating operation, a suitable receptacle 89 (FIGURES 2 and 3) is placed beneath the grater plate 41 and between the support legs 25 of the support section 11 to receive the cut food particles falling through the grater plate. The receptacle is vertically aligned with the food housing.

The power section 13 of the grating machine is best seen in FIGURES 5 and 6 and includes an electrically driven motor 61 which is enclosed in a box-shaped motor housing 62 having horizontally and vertically extending walls. The walls are formed of resilient material, such as sheet-metal, or the like, which is appropriately bent and suitably interconnected to the end plate 28 of the support section 11.

Horizontally disposed in an upper portion of the housing 62 adjacent a side wall 64 thereof is a guide rod 63, the ends of which are secured to opposing end walls 65, 66 of the housing. Located in the upper portion of the side wall 64 of the housing in alignment with the guide rod is a horizontally-extending slot 67 (FIGURE 2). A finger-like projection 68 projects through the slot and has its inner end 68a operatively secured to the guide rod 63 by a sleeve 69 which loosely surrounds the guide rod and is freely movable therealong. The sleeve 69 is, in turn, operatively connected to the drive shaft 61a of the motor 61 by a plurality of intermeshing gears 71, 72, 73 and link arms 74–76. The gears and link arms cooperate with the guide rod 63 and sleeve 69 to reciprocate the finger-like projection 68 longitudinally of the horizontal slot 67 during rotation of the drive shaft 61a.

The outer end 68b of projection 68 is upwardly bent and is fixedly connected to one end of a horizontally-disposed flat plate 91. Plate 91 is integrally formed at its opposite end with the frame member 31 (FIGURE 5), and the plate serves to rigidly connect the projection 68 and frame member for reciprocation of the frame member and grater plate 41. Although the plate 91 and frame member 31 are shown to be formed of a single sheet of metal which has been cut and bent to the desired configuration, they may be constructed of other suitably resilient material and rigidly interconnected in any convenient manner.

As best seen in FIGURES 1 and 6, the upper wall 92 of housing 62 has a projecting edge portion which forms a ledge 92a extending outwardly over the horizontal slot 67 and a portion of the finger-like projection 68. The ledge 92a serves as shield means to discourage the entrance into housing 62 of food particles which may be thrown outwardly from the greater plate 41 during operation of the machine. Of additional assistance in this regard is the connecting plate 91 (FIGURE 1), which also shieldingly extends over the slot 67 at times during reciprocation.

FIGURES 7 and 8 are illustrative of two of a plurality of additional grater plates which may be used interchangeably with the grater plate 41 of FIGURES 1 and 6. As shown, the grater plate 95 in FIGURE 8 has a plurality of elongate curved cutting edges 96 which are adapted to produce sliced sections of a food product urged against the plate. Other cutting shapes may be used, such as the four-pointed star-shaped cutting edges 97a shown on the portion of the grater plate 97 of FIGURE 9. It is to be understood that, although not shown, other grater plates having various shapes and sizes of cutting edges may be used interchangeably in the grating machine of the present invention.

In operation, a food product, such as a cabbage C, which is illustrated and shown in broken lines in FIGURE 2, is placed in the food housing 81 and the lid 82 placed thereon. Power is then supplied to energize motor 61 and reciprocate the frame member 31 and grater plate 41 along the guide members 21, 22. As the cutting edges 42 of the grater plate 41 engaging the lower surface of the food product are horizontally reciprocated relative thereto, they cut particles of food P (FIGURE 2) which drop beneath the grater plate and into the receptacle 89 located beneath the food housing. As can be seen, the support walls 82 and 83 of the housing 81 serve to confine the food particles to the area immediately beneath the open bottom of the housing. If desired, pressure may be applied to the food product during the grating operation by manually pressing the cover lid 82 downwardly toward the cutting surface of the grater plate.

During reciprocation of the grater plate 41, the exterior drive elements 68 and 91 connecting the motor 61 to the frame member 31 move in a straight-line horizontal direction and the flat plate 91 serves to protect an operator against accidental injury in the event that the operator's hand comes into engagement with the upper portion of the motor housing 62 or drive elements.

When it is desired to grate the food product into food particles of a different size, the grater plate may be readily changed to another plate of a desired cutting configuration, such as is shown in FIGURES 8 and 9. The plate 41 may be quickly removed by rotatably releasing the fastener 56, flexing the end of the plate 41 upwardly to disengage it from the projections 51, 52, and sliding it from under the guide clips 43, 44, leaving the frame member free to receive another grater plate, which is secured thereto by reversing the procedure just described.

From the foregoing detailed description of the invention, it can be appreciated that the present grating machine may be readily used to automatically grate different food products into a variety of different particle shapes and sizes with maximum operator safety and protection to the major power components of the machine.

In the drawings and specification there has been set forth a preferred embodiment of the invention and, although specific terms are employed, they are used in a generic and descriptive sense only and not for purposes of limitation, the scope of the invention being defined in the claims:

That which is claimed is:

1. A food grating machine comprising a pair of elongate guide members, means supporting said guide members in a generally horizontal plane and in coextending, parallel spaced relationship, an open frame member extending between said guide members and having a pair of opposing sides thereof connected to said guide members for reciprocal movement of said frame member along said guide members, a grater plate removably secured to said frame member with the grating surface thereof overlying the opening in said frame member, and means connected to said frame member for reciprocating said frame member and said grater plate along said guide members to grate food products urged against the grating surface of said plate.

2. A grating machine as defined in claim 1 including an open-bottomed housing adapted to receive a food product, means for removably supporting said housing above said frame member with the open bottom thereof in communication with the grating surface of said grater plate at the substantial midportion of its reciprocal movement whereby a food product placed in said housing is engaged by the grating surface of the plate during operation of the grating machine; and wherein said means supporting said housing includes a pair of opposing wall members respectively depending downwardly from opposite sides of said housing adjacent said guide members, said walls extending outside of and for a sufficient distance below said guide members to confine and direct grated food particles falling from said grater plate into a receptacle therebelow.

3. A grating machine as defined in claim 1 wherein said means for reciprocating said frame member and grater plate includes electric motor means located adjacent one end of said guide members, a motor housing enclosing said motor means and having a substantially horizontally-extending slot therein, a finger-like projection extending through and movable longitudinally of said slot, one end of said projection disposed within said housing and the other end positioned outside said housing, a substantially horizontal element rigidly connecting the outer end of said projection to an adjacent end portion of said frame member, and means in said housing connecting the inner end of said projection to said motor means for linear reciprocation of said projection and horizontal element in a substantially horizontal path to transmit reciprocation to said frame member.

4. A grating machine as defined in claim 3 including shield means overlying said horizontally-extending slot and a portion of said finger-like projection, said shield means serving to discourage the entrance of food particles into said motor housing through said slot during operation of said grating machine.

5. A grating machine as defined in claim 4 wherein said shield means includes a ledge carried by said housing and extending over said housing slot.

6. A grating machine as defined in claim 5 wherein said rigid element connecting said projection to said adjacent end portion of said frame member includes a flat plate, a portion of said flat plate at times overlying said motor housing slot and ledge and assisting in discouraging entrance of food particles into said motor housing.

7. A grating machine as defined in claim 3 wherein said motor housing includes a plurality of substantially vertical and horizontal walls interconnected to form a substantially box-like enclosure for said motor means, said housing slot being located in an upper portion of one of said vertical walls, and the upper horizontal wall of said enclosure projecting beyond said one of said vertical walls and overlying said slot to discourage the entrance of food particles into said enclosure through said slot during operation of said grating machine.

8. A food grating machine as defined in claim 1 including means releasably securing said grater plate to said frame member, said means comprising a guide clip located on each of said opposing sides of said frame member adjacent one end thereof, each of said guide clips overlying adjacent edge portions of said grater plate to resist movement of the adjacent end portion of the plate in an upward direction and in a direction transverse to the direction of reciprocation of said frame member, and said clips cooperating with said underlying frame member to permit sliding disengagement of said grater plate from said frame member in said direction of reciprocation.

9. A grating machine as defined in claim 8 wherein said securing means further includes aperture means in the other end portion of said grater plate opposite said clips, projecting means on the upper face of said frame member received by said aperture means to restrain movement of said grater plate in said direction of reciprocation, and rotatable locking means carried by said projection means to releasably secure said other end portion of said grater plate against upward movement away from said frame member.

10. A food grating machine as defined in claim 1 wherein said guide members comprise rod-shaped elements and said pair of opposing sides of said frame member have arcuately shaped, flanged edge portions loosely surrounding said elements for sliding movement thereon.

References Cited

UNITED STATES PATENTS

| 69,150 | 9/1867 | Worden | 146—178 |
| 635,161 | 10/1899 | Cook | 146—151 |
| 2,460,663 | 2/1949 | Walker | 146—178 |

W. GRAYDON ABERCROMBIE, *Primary Examiner.*

U.S. Cl. X.R.

146—62, 151